United States Patent

Okayama et al.

(10) Patent No.: US 6,670,027 B1
(45) Date of Patent: Dec. 30, 2003

(54) UNIAXIALLY ORIENTED POLYPROPYLENE-BASED FILM

(75) Inventors: Chikashi Okayama, Ichihara (JP); Takanori Nakashima, Ichihara (JP); Noriaki Saito, Ichihara (JP); Hiroyuki Maehara, Ichihara (JP); Yuya Ishimoto, Ichihara (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/380,107

(22) PCT Filed: Feb. 24, 1998

(86) PCT No.: PCT/JP98/00733

§ 371 (c)(1),
(2), (4) Date: Dec. 2, 1999

(87) PCT Pub. No.: WO98/37128

PCT Pub. Date: Aug. 27, 1998

(30) Foreign Application Priority Data

Feb. 24, 1997 (JP) ................................. 9-39442

(51) Int. Cl.[7] .......................... B32B 5/02; B32B 27/32
(52) U.S. Cl. ................ 428/299.7; 428/297.4; 428/298.1; 428/323; 428/327; 428/500; 428/910
(58) Field of Search ............... 428/323, 297.4, 428/299.7, 113, 293.7, 298.1, 327, 500, 903, 910

(56) References Cited

U.S. PATENT DOCUMENTS 4,439,493 A * 3/1984 Hein et al. .................. 428/516
5,512,649 A * 4/1996 Hendrickson-Benkhoff et al. .......................... 428/523
5,670,225 A * 9/1997 Yamanaka et al. ......... 428/40.1
5,780,168 A * 7/1998 Satoh et al. ................. 428/516

FOREIGN PATENT DOCUMENTS

| EP | 719 829 | 7/1996 |
|---|---|---|
| JP | 53 031741 | 3/1978 |
| JP | 57190064 | 11/1982 |
| JP | 61 213244 | 9/1986 |
| JP | 06-239918 | 8/1994 |
| JP | 07 309985 | 11/1995 |
| JP | 7 329 177 | 12/1995 |
| JP | 08-027238 | 1/1996 |

* cited by examiner

*Primary Examiner*—Monique R. Jackson
(74) *Attorney, Agent, or Firm*—Kilpatrick Stockton LLP

(57) ABSTRACT

To provide a uniaxially oriented polypropylene-based film excellent in tensile elongation along the TD direction and transparence, and generating less fibers when it is torn, a film-forming material which comprises a polypropylene-based resin material consisting of 40 to 95% by weight of crystalline polypropylene, and 60 to 5% by weight of propylene-α-olefin copolymer dispersed as particles in the crystalline polypropylene is uniaxially oriented to afford a uniaxially oriented polypropylene-based film, wherein the particles of the copolymer have an aspect ratio (L/D) of mean dispersed particle length (L) to mean dispersed particle diameter along the film thickness direction (D) of 100 or more in a cross section of the film along the MD direction, and the mean dispersed particle diameter of 0.10 μm or less.

7 Claims, 3 Drawing Sheets

(a)

(b)

(c)

UNIAXIALLY ORIENTED POLYPROPYLENE-BASED FILM

TECHNICAL FIELD

The present invention relates to a uniaxially oriented film formed from a film-forming material comprising a polypropylene-based resin material. More precisely, it relates to a uniaxially oriented polypropylene-based film in which tensile elongation along the transverse direction is improved without degrading transparence.

BACKGROUND ART

Uniaxially oriented polypropylene-based films have a property that they are likely to be torn along the film-flowing direction during the film production, i.e., the longitudinal direction called machine direction (MD direction), and thus they are excellent in cuttability along that direction (straight cuttability). Therefore, they are widely used mainly in the field of food packaging, for example, individual packaging of products likely to break, such as confectionery, individual packaging of rice balls and the like.

While conventional uniaxially oriented polypropylene-based films are excellent in the straight cuttability along the MD direction, however, they are poor in elongation along the perpendicular direction to the MD direction (TD direction), and therefore they are likely to be torn when force is applied along the TD direction. Therefore, the films may be broken when used for packaging of heavy contents.

Further, when the conventional uniaxially oriented polypropylene-based films are torn along the MD direction, they generate fine fibers on their torn surfaces, which may be mixed in foodstuffs and the like.

DESCRIPTION OF THE INVENTION

The object of the present invention is to provide a uniaxially oriented polypropylene-based film in which tensile elongation along the TD direction is improved without degrading transparence of the film, and which generates less fibers when it is torn.

The present inventors earnestly conducted studies in order to achieve the foregoing object. As a result, they found that, in a uniaxially oriented film composed of a polypropylene-based resin material comprising a propylene-α-olefin copolymer dispersed as particles in crystalline polypropylene, the straight cuttability along the MD direction and the tensile elongation along the TD direction could be improved without degrading the transparence by controlling form of the film so that the film should have a specific dispersion state of the copolymer particles in a cross section along the MD direction of the film. Thus, they accomplished the present invention.

That is, the present invention provides a uniaxially oriented polypropylene-based film formed from a film-forming material which comprises a polypropylene-based resin material consisting of 40 to 95% by weight of crystalline polypropylene, and 60 to 5% by weight of propylene-α-olefin copolymer dispersed as particles in the crystalline polypropylene, wherein the particles of the copolymer have an aspect ratio (L/D) of mean dispersed particle length (L) to mean dispersed particle diameter along the film thickness direction (D) of 100 or more in a cross section along the MD direction of the film, and the mean dispersed particle diameter of 0.10 μm or less.

The present invention also provides a uniaxially oriented polypropylene-based film formed from a film-forming material which comprises a polypropylene-based resin material consisting of 40 to 95% by weight of crystalline polypropylene, and 60 to 5% by weight of propylene-α-olefin copolymer, and has a ratio of MFR of the crystalline polypropylene to that of the propylene-α-olefin copolymer (MFR of the crystalline polypropylene/MFR of the propylene-α-olefin copolymer) of 10 or less, wherein the film is uniaxially oriented along the MD direction so that the orienting ratio should be 3 to 12 times.

The uniaxially oriented film of the present invention comprises the copolymer particles dispersed elongatedly in a matrix of the crystalline polypropylene in such a manner the particles should have an aspect ratio higher than a certain level, and an oriented film composed of a polyolefin-based resin material having such a dispersion state has been made by the present invention for the first time.

According to the present invention, there can be obtained an oriented film that exhibits good straight cuttability along the MD direction, excellent tensile elongation along the TD direction and high transparence, and does not generate fibers, thanks to such a characteristic in form.

The production method of the film is not particularly limited so long as an oriented film having such a characteristic in form as mentioned above can be provided. However, a uniaxially oriented polypropylene-based film which is composed of a polypropylene-based resin material comprising crystalline polypropylene and propylene-α-olefin copolymer and having a ratio of MFR of the crystalline polypropylene to that of the propylene-α-olefin copolymer of 10 or less, and oriented under a certain condition can have the aforementioned characteristic.

The uniaxially oriented film of the present invention is useful as a film for package, in particular, as a film for packaging heavy contents or for food package.

Preferred embodiments of the present invention will be explained hereinafter.

(1) Polypropylene-based Resin Material of the Present Invention

The film-forming material for forming the uniaxially oriented film of the present invention comprises a polypropylene-based resin material that consists of crystalline polypropylene and propylene-α-olefin copolymer, the copolymer being dispersed as particles in the crystalline polypropylene (the copolymer is dispersed as domains in a matrix of the crystalline polypropylene).

(i) Crystalline polypropylene

The crystalline polypropylene used for the present invention is a crystalline polymer comprising principally of propylene units, and preferably comprises 90% by weight or more of the propylene units based on the whole polymer. Specifically, it may be a homopolymer of propylene, or it may be a random copolymer or a block copolymer comprising 90% by weight or more of propylene units and less than 10% by weight of α-olefin. When it is a copolymer, the α-olefin may include ethylene, 1-butene, 1-pentene, 1-hexene, 1-octene, 1-decene, 1-dodecene, 4-methyl-1-pentene, 3-methyl-1-pentenel, and the like. It is preferable in view of the production cost to use a propylene homopolymer or propylene-ethylene copolymer having a propylene unit content of 90% by weight or more.

The melt flow rate (abbreviated as "MFR" hereinafter) of the crystalline polypropylene is preferably in the range of 0.1–50 g/10 minutes in view of the stability upon film-forming.

(ii) Propylene-α-olefin copolymer

The propylene-α-olefin copolymer used for the present invention is a random copolymer of propylene and an α-olefin other than propylene. The content of propylene unit is preferably in the range of 20–80% by weight, more preferably 20–75% by weight, particularly preferably 20–70% by weight based on the whole copolymer. When the content of propylene unit exceeds 80%, the desired dispersed state of the copolymer particles (referred to as "copolymer domains" hereinafter) in the matrix of crystalline polypropylene may not be obtained, and hence the improvement of the tensile elongation along the TD direction targeted in the present invention may not be obtained. On the other hand, when it is less than 20%, the copolymer domains are difficult to be formed, and thus the desired performance may not be obtained.

As the α-olefin other than propylene, ethylene, 1-butene, 1-pentene, 1-hexene, 1-octene, 1-decene, 1-dodecene, 4-methyl-1-pentene, 3-methyl-1-pentene and the like can be mentioned. Among these, a propylene-ethylene copolymer containing ethylene as the α-olefin is preferably used because it is beneficial to the production cost.

While MFR of the propylene-α-olefin copolymer used for the present invention is not particularly limited, it is preferably in the range of 0.1–20 g/10 minutes.

More preferably, MFR of the propylene-α-olefin copolymer is preferably selected so that its ratio to MFR of the crystalline polypropylene (MFR of the crystalline polypropylene/MFR of the propylene-α-olefin copolymer, referred to as "MFR ratio" hereinafter) should be 10 or less, more preferably fall within the range of 0.1–5.

(iii) Polypropylene-based resin material

In the polypropylene-based resin material of the present invention, the content of the crystalline polypropylene is 40–95% by weight, preferably 50–95% by weight, and the content of the propylene-α-olefin copolymer is 60–5% by weight, preferably 50–5% by weight based on the whole polypropylene-based resin material. When the ratio of the copolymer is less than 5% by weight, satisfactory tensile elongation along the TD direction cannot be obtained. When it exceeds 60%, the rigidity of the film is markedly decreased, and it is not preferred for practical use.

The production method of the polypropylene-based resin material is not particularly limited, and it can be obtained by any kind of method. For example, it can be obtained by mixing crystalline polypropylene and propylene-α-olefin copolymer, which were polymerized separately, through melt-kneading or the like. Alternatively, it can be obtained by continuously polymerizing crystalline polypropylene and propylene-α-olefin copolymer by multi-step polymerization.

Specifically, a method based on melt-kneading of propylene-α-olefin copolymer polymerized by using a Ziegler-Natta catalyst such as titanium-supported catalyst or commercially available ethylene-propylene rubber and crystalline polypropylene can be exemplified. As the method for continuously polymerizing crystalline polypropylene and propylene-α-olefin copolymer by multi-step polymerization, for example, a method comprising producing propylene homopolymer in the first step, and producing propylene-α-olefin copolymer in the second step by utilizing a plurality of polymerization reactors can be exemplified. This continuous polymerization method is preferred, because it can be performed at a lower cost compared with the aforementioned melt-mixing method, and can produce a polypropylene-based resin material where the propylene-α-olefin copolymer is uniformly dispersed in the crystalline polypropylene, and it is suitable for stably realizing the desired quality (tensile elongation along the TD direction, preventing the generation of fibers, good transparence).

As the polypropylene-based resin material of the present invention, particularly preferred are those produced by the aforementioned continuous polymerization method so that the resulting material should have the MFR ratio of the crystalline polypropylene to that of the propylene-α-olefin copolymer (MFR of the crystalline polypropylene/MFR of the propylene-α-olefin copolymer) of 10 or less, more preferably in the range of 0.1–5. By selecting the MFR ratio within this range, the propylene-α-olefin copolymer can be uniformly and finely dispersed in the crystalline polypropylene, and the copolymer particles can have elongated form with an aspect ratio higher than a certain level after the uniaxial orienting. This provides a polypropylene-based oriented film that shows good straight cuttability along the MD direction, and tensile elongation along the TD direction further improved without degrading the transparence.

Specifically, polypropylene-based resin materials having such an MFR ratio can be produced by the methods mentioned in Japanese Patent Unexamined Publication Nos. 6-239918, 8-27238, and the like.

The MFR ratio can usually be calculated by measuring the MFR of the crystalline polypropylene and the MFR of the propylene-α-olefin copolymer respectively, but when the polypropylene-based resin material is continuously produced by the multi-step polymerization method (the crystalline polypropylene is polymerized first, and then the propylene-α-olefin copolymer is polymerized), the MFR of the propylene-α-olefin copolymer cannot be directly measured. In such a case, the MFR of the propylene-α-olefin copolymer can be obtained from the MFR of the crystalline polypropylene, which can be directly measured, the MFR of the obtained polypropylene-based resin material, and the content of the propylene-α-olefin copolymer in the polypropylene-based resin material according to the following equation:

$$\log(MFR_{RC}) = \frac{\log(MFR_{whole}) - (1 - W_{RC}/100)\log(MFR_{PP})}{W_{RC}/100}$$

$MFR_{RC}$: MFR of propylene-α-olefin copolymer
$MFR_{whole}$: MFR of polypropylene-based resin material
$MFR_{PP}$: MFR of crystalline polypropylene
$W_{RC}$: Content of propylene-α-olefin copolymer in polypropylene-based resin material (2) Film-forming Material of the Present Invention While the film-forming material of the present invention is mainly composed of the aforementioned polypropylene-based resin material, it may further contain additives conventionally used for polyolefin-based film materials, for example, antioxidant, neutralizer, weathering agent, inorganic filler, lubricant, anti-blocking agents, antistatic agent and the like.

Examples of the antioxidant include, for example, phenol compound antioxidants such as tetrakis[methylene-3-(3',5'-di-t-butyl-4'-hydroxyphenyl)propionate]methane, 2,6-di-t-butyl-4-methylphenol, n-octadecyl-3-(3',5'-di-t-butyl-4'-hydroxyphenyl)propionat e, and tris(3,5-di-t-butyl-4-hydroxybenzyl) isocyanurate; phosphorus-containing antioxidants such as tris(2,4-di-t-butylphenyl) phosphite, tris(nonylphenyl) phosphite, distearylpentaerythritol diphosphite, and tetrakis(2,4-di-t-butylphenyl)-4,4'-biphenylenediphosphonite, and the like.

Examples of the neutralizer include, for example, salts of higher fatty acid such as calcium stearate; examples of the inorganic filler and the anti-blocking agents include, for example, calcium carbonate, silica, hydrotalcite, zeolite, aluminum silicate, magnesium silicate and the like; examples of the lubricant include, for example, higher fatty acid amides such as stearic acid amide and the like; and examples of the antistatic agents include, for example, fatty acid esters such as glycerin monostearate and the like.

While the amounts of these additives may be suitably selected depending on the intended use of the film and the like, they are preferably used in an amount of about 0.001–5% based on the whole film-forming material in general.

The method for mixing the polypropylene-based resin material and the aforementioned additives is not particularly limited, and it can be performed, for example, by mixing methods utilizing conventional mixing apparatuses including mixers provided with high-speed agitators such as Henschel mixer (trade name), ribbon blender and tumbler mixer and the like (dry blend), as well as methods for pelletization utilizing a conventional single-screw extruder, double-screw extruder and the like.

(3) Uniaxial Orienting

The uniaxially oriented film of the present invention can be obtained by uniaxially orienting the aforementioned film-forming material. The orienting can be performed by molding an unoriented sheet by the known T-die cast method, water-cooled inflation method or the like, and then orienting it by a known uniaxial orienting method such as the roll orienting method.

While the orienting ratio along the MD direction (longitudinal orienting ratio) for the uniaxially oriented film of the present invention is not particularly limited, it is, for example, 3–12 times, preferably 5–10 times. An orienting ratio in such a range can afford an aspect ratio of 100 or more for the ratio of the mean dispersed particle length to the mean dispersed particle diameter along the film thickness direction in a cross section of the propylene-α-olefin copolymer domains along the MD direction, and provide a film with improved tensile elongation without degrading the transparence.

(4) Uniaxially Oriented Polypropylene-based Film

In the uniaxially oriented polypropylene-based film of the present invention, the propylene-α-olefin copolymer domains dispersed as particles in the crystalline polypropylene have a mean dispersed particle diameter along the film thickness direction of 0.10 μm or less, preferably 0.05 μm or less in a cross section along the MD direction. When the mean dispersed particle diameter is more than 0.10 μm, the tensile elongation along the TD direction is lowered, and transparence is also degraded. On the other hand, the lower limit of the mean dispersed particle diameter is not particularly defined, and it may be however small so long as the copolymer domains can be observed. However, the mean dispersed particle diameter is preferably not less than 0.005 μm.

The uniaxially oriented film of the present invention is also characterized by the aspect ratio (L/D) of 100 or more, preferably 300 or more, as for the ratio of the mean dispersed particle length (L) to the aforementioned mean dispersed particle diameter (D) of the copolymer domains in a cross section along the MD direction.

The relationship between the mean dispersed length (L) and the mean dispersed particle diameter (D) is schematically shown in FIGS. 1(a) and (b). The mean dispersed particle diameter (D) in a cross section along the MD direction is the average of the particle diameter (breadth) of the dispersed particles along the film thickness direction when the cross section of the film along the MD direction is observed from the perpendicular direction to the MD direction (MD observation: edge view). The mean dispersed length (L) is the average of the length of the dispersed particles in the aforementioned MD observation.

According to the present invention, such fine and elongated copolymer domains are uniformly dispersed in the matrix. This provides a uniaxially oriented film excellent in tensile elongation along the TD direction, and exhibiting transparence not degraded. An aspect ratio of less than 100 is not preferred, because the film with such an aspect ratio may degrade the tensile elongation along the TD direction and transparence.

Although the upper limit of the aspect ratio is not particularly limited, it is preferably about 700 when a length of one copolymer particle is regarded as the particle diameter along the MD direction of the copolymer domain. However, the copolymer particles may be fused and connected each other along the MD direction by the orienting along the MD direction. In this case, when the multiple fused copolymer particles is considered as one copolymer domain, the particle diameter along the MD direction may be several times as large as the length of one copolymer particle. The maximum aspect ratio of such a copolymer domain may be several times that of the individual one copolymer particle, specifically 10 to 50 times. In this case, the aspect ratio may reach as high as around 1000 to 5000.

When a cross section along the TD direction of the film of the present invention is observed from the perpendicular direction to the TD direction (TD observation: end view), the copolymer domains may be in a flattened form due to the uniaxial orienting along the MD direction. In such a case, the aspect ratio (L'/D) of the mean dispersed length (L') to the mean dispersed particle diameter (D) along the film thickness direction in the cross section along the TD direction is preferably, while it is not particularly limited, about 80 to about 600. The TD observation is schematically shown in FIG. 1(c).

According to the present invention, it was found for the first time that a film containing the copolymer domains which exhibited such a fine mean dispersed particle diameter and such an aspect ratio as described above was excellent in the tensile elongation along the TD direction, and does not degrade transparence. Therefore, the film of the present invention may be a film obtained by any kind of method so long as the film satisfies the requirements concerning the particle diameter of the copolymer domains. However, it can specifically be obtained by orienting a polypropylene-based resin material produced by the above-mentioned continuous polymerization method.

Particularly preferably, the film can be obtained by uniaxially orienting a polypropylene-based resin material being produced by the continuous polymerization method and having a ratio 10 or less of MFR of the crystalline polypropylene to that of the propylene-α-olefin copolymer to have an orienting ratio of about 3 to 12 times.

The thickness of the uniaxially oriented polypropylene-based film of the present invention is not particular limited, but it is preferably 10–100 μm, more preferably 15–70 μm, in view of the film-forming property of the film.

The uniaxially oriented polypropylene-based film of the present invention is excellent in the straight cuttability along the MD direction and the tensile elongation along the TD direction, does not generate fibers, and retains transparence. Therefore, it can be preferably used as a material for packaging heavy contents, material for packaging foodstuffs such as sandwiches and rice balls, and the like.

The uniaxially oriented polypropylene-based film of the present invention can also be used for a multilayer film comprising two or more layers, which can be prepared by laminating one or more films made of other resins on one or both sides of the film of the present invention. The other resins used for such a laminated film are not particularly limited, and various resins can be used depending on the purpose of the film. For example, when a layer composed of heat adhesive resin such as propylene-α-olefin copolymer having a low melting point is provided on the uniaxially oriented film of the present invention, it can be used as various package materials. As production methods of such a multilayer film, the inline laminating method, the co-extrusion method and the like, which are performed during the film molding, as well as the dry laminating method and the like where the lamination is performed after the film molding, can be utilized.

BRIEF EXPLANATION OF THE DRAWINGS

FIG. 1($a$) is a perspective view of the film, FIG. 1($b$) is a view of the MD observation representing a cross section along the MD direction, and FIG. 1($c$) is a view of the TD observation representing a cross section along the TD direction.

BEST MODE FOR CARRYING OUT THE INVENTION

Figure 1:
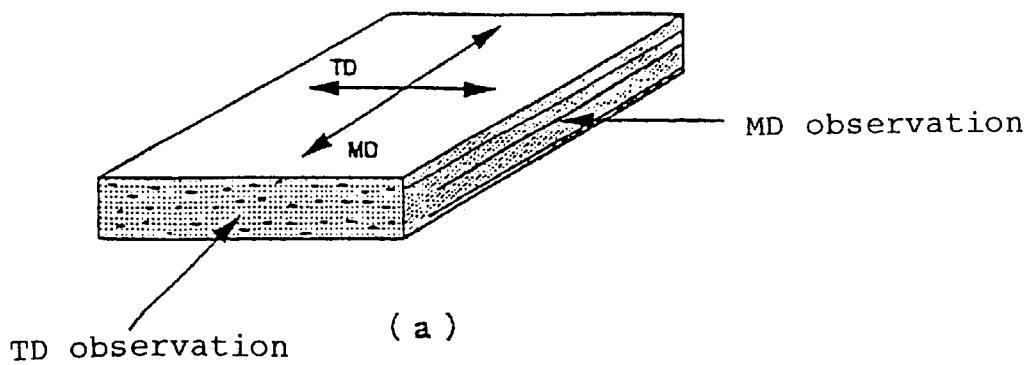
FIG. 1 includes schematic views representing the relationship between the mean dispersed length (L) and the mean dispersed particle diameter (D) in a cross section along the MD direction.
Figure 1:
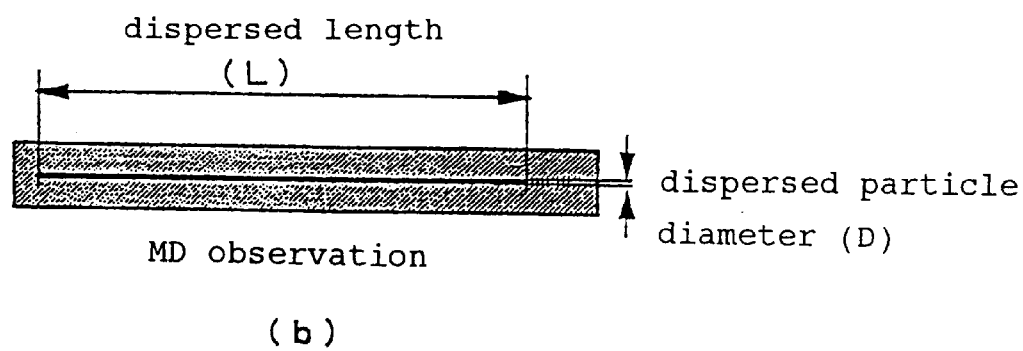
Figure 1:
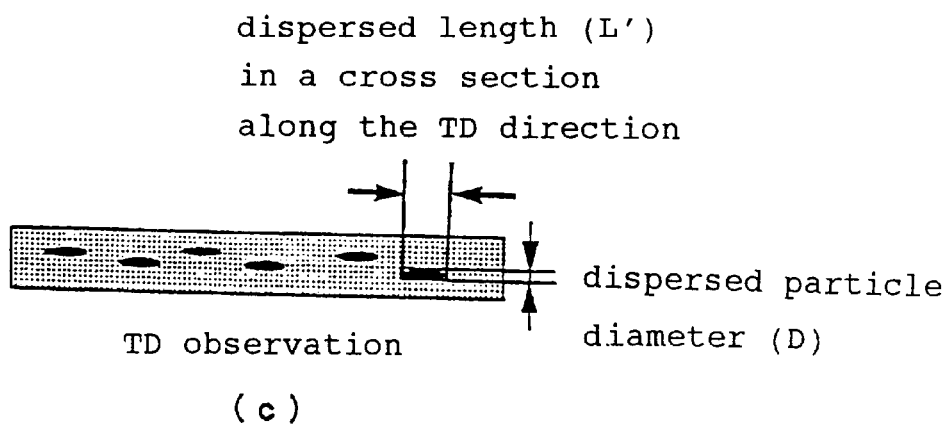

The present invention will be further explained more specifically hereinafter with reference to the following examples, but the present invention is not limited by these examples.

EXAMPLES 1–6 AND COMPARATIVE EXAMPLES 1–4

(1) Production of Film-forming Materials

To the polypropylene-based resin materials shown in Table 1 were each added 0.1% by weight of tetrakis [methylene-3-(3+,5'-di-t-butyl-4'-hydroxyphenyl) propionate]methane as a phenol compound antioxidant, 0.1% by weight of tris(2,4-di-t-butylphenyl)phosphite as a phosphorus-containing antioxidant, and 0.1% by weight of calcium stearate as a neutralizer, based on the whole film-forming material. These were blended by a Henschel mixer (trade name), melt-kneaded and pelletized by a single-screw extruder (aperture of 40 mm) to afford a film-forming material.

The polypropylene-based resin materials used in these examples were obtained by the continuous polymerization method where crystalline polypropylene was polymerized in the first step, and propylene-α-olefin copolymer (propylene-ethylene copolymer) was polymerized in the second step. However, the polypropylene-based resin material used in Comparative Example 3 was obtained by melt-kneading of commercially available ethylene-propylene rubber (propylene content: 27% by weight, produced by Japan Synthetic Rubber Co., Ltd) and crystalline polypropylene.

The values of MFR of the polypropylene-based resin materials and that of the crystalline polypropylenes shown in Table 1 were determined according to JIS-K-7210 under the conditions of test temperature of 230° C. and test load of 21.18 N.

(2) Production of Uniaxially Oriented Films

Each film-forming material in the form of pellets obtained above was melt-extruded at 260° C. by using an extruder equipped with a T-die, and cooled by a cooling roller at 30° C. to be solidified to obtain an unoriented sheet. This sheet was preheated at 90° C. by a preheating roll, and oriented 5 times along the longitudinal direction (MD direction) between rolls at 100° C. to form a uniaxially oriented film with a thickness of 30 μm.

(3) Evaluation

Various physical properties of the obtained uniaxially oriented films, i.e., mean dispersed particle diameter and aspect ratio in a cross section along the MD direction of the copolymer domains in the films, transparence of the films (haze), Young's modulus along the MD direction, and tensile breaking elongation along the TD direction are shown in Table 1. The methods for evaluating these physical properties are as follows.

(a) Particle diameter and aspect ratio in cross section along MD direction of copolymer domains Uniaxially oriented film was cut along the perpendicular directions to the MD direction and the TD direction respectively, dyed in vapor phase with a ruthenium compound (RuO$_4$) for 48 hours, and then cut into pieces having a thickness of about 100 nm with a diamond knife using an ultramicrotome to prepare ultrathin sections. The obtained ultrathin sections were observed by using a transmission electron microscope (tradename: JEOLEM 100CX) at magnifications of 10,000 and 30,000, each of mean dispersed length of the copolymer domains and mean dispersed particle diameter along the film thickness direction in the cross section along the MD direction was obtained through statistical processing of the electron microscope photograph, and aspect ratio was calculated from them.

(b) Tensile breaking elongation (TD direction)

Degree of tensile breaking elongation (tensile elongation) along the TD direction of each uniaxially oriented film was measured according to ASTM-D-882, and used as an index of difficulty for tearing along the MD direction. A larger value means that the film is more difficult to be torn along the MD direction.

(c) Haze

Haze of uniaxially oriented film (unit: %) was measured according to ASTM-D-1003, and used as a parameter of transparency. A smaller value indicates better transparency.

(d) Young's modulus (MD direction)

According to ASTM-D-523, Young's modulus along the MD direction of uniaxially oriented film was measured, and used as a parameter of rigidity. A larger value indicates that the film had higher rigidity.

TABLE 1

|  | Example | | | | | | Comparative Example | | | |
| --- | --- | --- | --- | --- | --- | --- | --- | --- | --- | --- |
|  | 1 | 2 | 3 | 4 | 5 | 6 | 1 | 2 | 3 | 4 |
| (1) Polypropylene-based resin | | | | | | | | | | |
| Crystalline polypropylene content (wt %) | 83.5 | 76.9 | 67 | 67 | 67 | 57 | 96 | 80 | 80 | 100 |
| Propylene content in crystalline polypropylene (wt %) | 100 | 100 | 100 | 99.7*[1] | 100 | 100 | 100 | 100 | 100 | 100 |
| Copolymer*[2] content (wt %) | 16.5 | 23.1 | 33 | 33 | 33 | 43 | 4 | 20 | 20 | 0 |
| Propylene content in copolymer (wt %) | 64 | 60 | 60 | 62 | 55 | 64 | 36 | 50 | 27 | 0 |
| MFR of polypropylene-based resin (g/10 min) | 2.8 | 3.4 | 0.5 | 3.1 | 8 | 0.4 | 2.8 | 9.4 | 5.5 | 2 |
| MFR of crystalline polypropylene (g/10 min) | 3.2 | 5 | 0.5 | 3.1 | 11.5 | 0.4 | 3 | 22 | 9.2 | 2 |
| Ratio of MFR*[3] | 2 | 2 | 1 | 1 | 3 | 1 | 2 | 75 | 13.1 | * |
| (2) Various physical properties of film | | | | | | | | | | |
| Mean dispersed particle diameter of copolymer (μm) | 0.04 | 0.04 | 0.035 | 0.035 | 0.04 | 0.04 | 0.04 | 0.15 | 0.27 | — |
| Aspect ratio of copolymer (L/D) | >300 | >300 | >300 | >300 | >300 | >300 | >300 | 35 | 30 | — |
| Haze (%) | 8 | 11 | 12 | 10 | 15 | 19 | 18 | 68 | 74 | 4 |
| Young's modulus (MPa) | 2200 | 1900 | 1500 | 1400 | 1300 | 1100 | 3000 | 2100 | 2300 | 3100 |
| Tensile breaking elongation (TD, %) | 490 | 720 | 1070 | 950 | 760 | 1280 | 7 | 360 | 260 | 5 |

Figure 2:
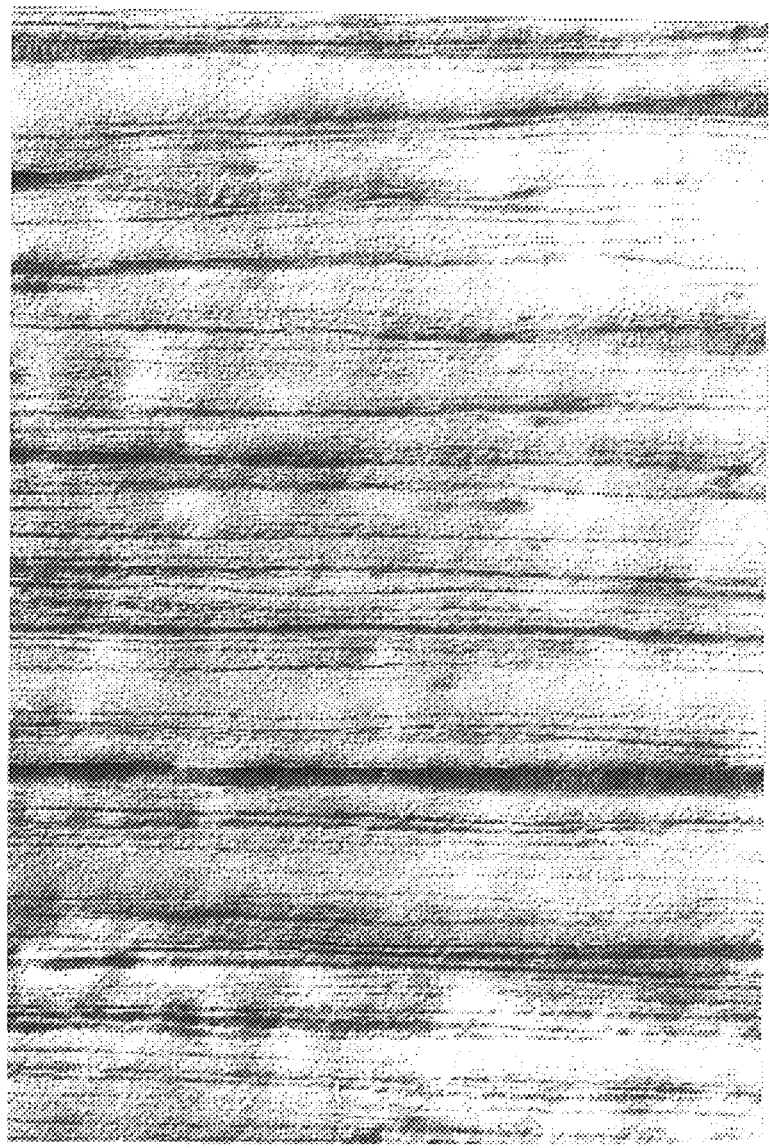
FIG. 2 is an electron microscope photograph (magnification: ×7500) which shows the particle state of copolymer domains along the MD direction in the uniaxially oriented film obtained in Example 3.
Figure 3:
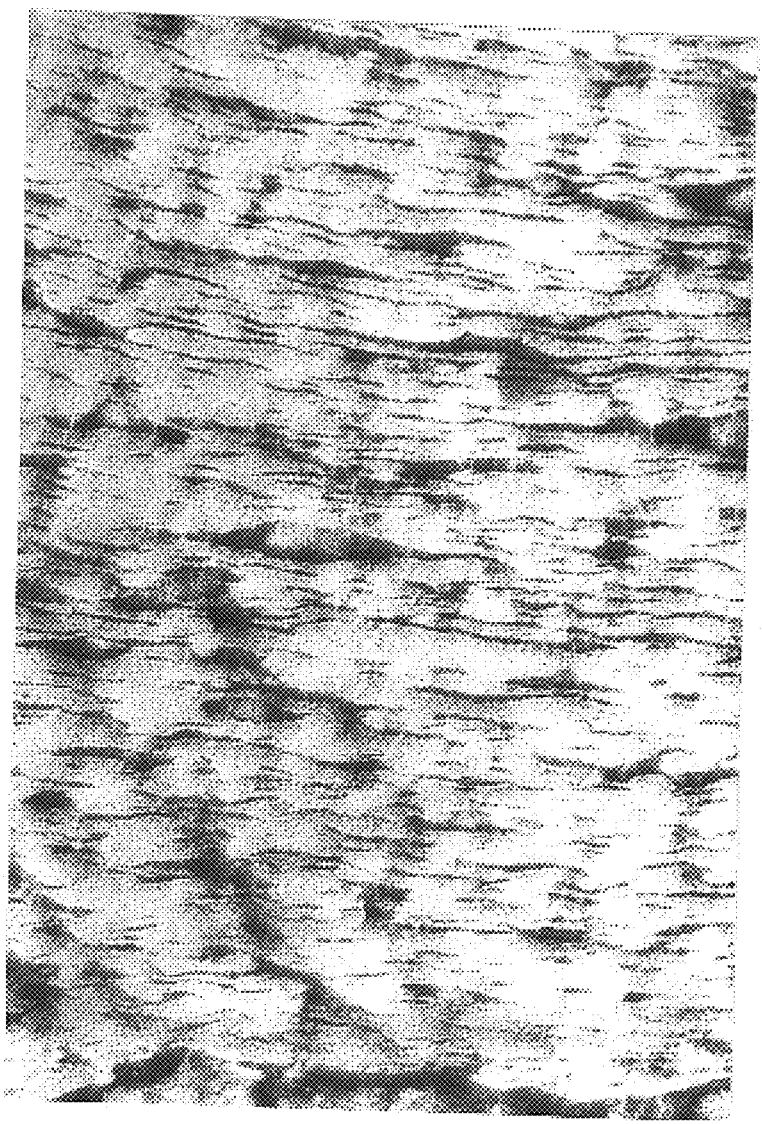
FIG. 3 is an electron microscope photograph (magnification: ×7500) which shows the particle state of copolymer domains along the TD direction in the uniaxially oriented film obtained in Example 3.

*[1] Propylene/ethylene copolymer
*[2] Propylene/ethylene copolymer
*[3] Ratio of MFR = MFR of crystalline PP/MFR of copolymer The electron microscope photograph (magnification: ×7500) of the ultrathin section, used for obtaining the mean dispersed particle diameter and the mean dispersed length of the copolymer domains in a cross section along the MD direction of the uniaxially oriented film obtained in Example 3, was shown in FIG. 2. FIG. 2 shows a photograph obtained by observing from the perpendicular direction to the MD direction (MD observation). An electron microscope photograph obtained by observing from the perpendicular direction to the TD direction (TD observation) is shown in FIG. 3. FIG. 2 and FIG. 3 show electron microscope photographs representing particle state of the copolymer domains in the aforementioned film along the MD and TD directions.

As seen from the results shown in Table 1, the films of Examples 1–6 showed high tensile elongation along the TD direction, and were also excellent in rigidity (Young's modulus) and transparence (haze). Moreover, as seen from FIGS. 2 and 3, the uniaxially oriented film of the present invention had elongated copolymer domains dispersed finely and uniformly.

On the other hand, the film of Comparative Example 1 had a low content of the propylene-α-olefin copolymer in the polypropylene-based resin material and sufficient tensile elongation could not be obtained. In Comparative Examples 2 and 3, obtained were only films showing too large mean dispersed particle diameters of the propylene-α-olefin copolymer and having low aspect ratios, poor transparence, and low tensile elongation along the TD direction. In Comparative Example 4, the polypropylene-based resin material composed only of crystalline polypropylene was used, and thus a film having sufficient tensile elongation could not be obtained.

INDUSTRIAL APPLICABILITY

The uniaxially oriented film of the present invention has good straight cuttability along the MD direction, and generates few fibers when it is torn, and it is excellent in tensile elongation and strength along the TD direction, and retains transparence.

What is claimed is:

1. A uniaxially oriented polypropylene film formed from a film-forming material which comprises a polypropylene resin material consisting of 40 to 95% by weight of crystalline polypropylene, and 60 to 5% by weight of propylene-α-olefin copolymer dispersed as particles in the crystalline polypropylene, wherein the crystalline polypropylene is a propylene homopolymer or a propylene-α-olefin copolymer having propylene unit content of 90% or more by weight, the propylene-α-olefin copolymer dispersed as particles contains 20–80% by weight of propylene polymerization units, the polypropylene resin material is obtained by continuously polymerizing the crystalline polypropylene and the propylene-α-olefin copolymer dispersed as particles by multi-step polymerization, and the particles of the copolymer have an aspect ratio (L/D) of mean dispersed particle length (L) to mean dispersed particle diameter along the film thickness direction (D) of 100 or more in a cross section of the film along the MD direction, and the mean dispersed particle diameter of 0.10 μm or less.

2. The uniaxially oriented polypropylene of claim 1, wherein a ratio of MFR of the crystalline polypropylene to that of the propylene-α-olefin copolymer dispersed as particles, which represents MFR of the crystalline polypropylene/MFR of the propylene-α-olefin copolymer dispersed as particles, is 10 or less.

3. The uniaxially oriented polypropylene film of claims 1 or 2, wherein the propylene-α-olefin copolymer dispersed as particles comprises a propylene unit and an ethylene unit.

4. The uniaxially oriented polypropylene film of claims 1 or 2, wherein the crystalline polypropylene is a propylene homopolymer or a propylene-ethylene copolymer, and the propylene-α-olefin copolymer dispersed as particles is a propylene-ethylene copolymer.

5. A uniaxially oriented polypropylene film formed from a film-forming material which comprises a polypropylene resin material consisting of 40 to 95% by weight of crystalline polypropylene, and 60 to 5% by weight of propylene- α-olefin copolymer dispersed as particles, and has a ratio of 10 or less of MFR of the crystalline polypropylene to that of the propylene-α-olefin copolymer, wherein the film is uniaxially oriented along the MD direction so that the oriented ratio is 3 to 12 times, and wherein the particles of the copolymer have an aspect ratio (L/D) of mean dispersed particle length (L) to mean dispersed particle diameter along the film thickness direction (D) of 100 or more in a cross section of the film along the MD direction, and the mean dispersed particle diameter of 0.10 μm or less.

6. The uniaxially oriented polypropylene film of claim 5, wherein the propylene-α-olefin copolymer comprises a propylene unit and an ethylene unit.

7. The uniaxially oriented polypropylene film of claim 5, wherein the crystalline polypropylene is a propylene homopolymer or a propylene-ethylene copolymer, and the propylene-α-olefin copolymer is a propylene-ethylene copolymer.

* * * * *